United States Patent [19]

Nakagawa

[11] Patent Number: 4,919,356
[45] Date of Patent: Apr. 24, 1990

[54] VIDEOTAPE TAPE GUIDE

[75] Inventor: Kiyoshi Nakagawa, Ishikawa, Japan

[73] Assignee: Fuji Kogyo Kabushiki Kaisya, Mattou, Japan

[21] Appl. No.: 255,378

[22] Filed: Oct. 11, 1988

[30] Foreign Application Priority Data

Oct. 29, 1987 [JP] Japan .................. 62-166174

[51] Int. Cl.⁵ .................. B65H 23/04; B65H 27/00
[52] U.S. Cl. .................... 242/199; 242/76
[58] Field of Search ................. 242/197–199, 242/76; 360/132; 226/196, 197, 199

[56] References Cited

U.S. PATENT DOCUMENTS

| 4,168,043 | 9/1979 | Shiba | 242/199 |
| 4,313,551 | 2/1982 | Umehara | 242/199 X |
| 4,620,255 | 10/1986 | Cook et al. | 242/199 X |
| 4,736,904 | 4/1988 | Schoettle et al. | 242/199 |
| 4,770,367 | 9/1988 | Carroll | 242/199 |
| 4,773,615 | 9/1988 | Carroll | 242/199 |
| 4,789,114 | 12/1988 | Tanaka | 242/199 |

FOREIGN PATENT DOCUMENTS

| 4032209 | 11/1940 | Japan . |
| 108589 | 7/1980 | Japan . |
| 35646 | 8/1980 | Japan . |
| 63883 | 4/1984 | Japan . |
| 23833 | 7/1985 | Japan . |
| 24885 | 2/1986 | Japan . |

*Primary Examiner*—Donald Watkins
*Attorney, Agent, or Firm*—Clifford A. Poff

[57] ABSTRACT

A videotape tape guide for guiding videotape in a videocassette. The videotape tape guide is comprised of an elongated cylinder having first and second open ends. A groove extends longitudinally from the first open end of the elongated cylinder to the second open end of the cylinder. The longitudinally extending groove allows the material required to form the tape guide to be reduced, thereby reducing the cost of the tape guide. Further, the groove allows firm seating in the videocassette to prevent rotation of the tape guide when positioned therein.

3 Claims, 1 Drawing Sheet

VIDEOTAPE TAPE GUIDE

BACKGROUND OF THE INVENTION

1. Field of the Invention:

The present invention relates generally to videotapes, and, more particularly, to a videotape tape guide for a videocassette.

2. Description of the Prior Art:

Videotape tape guides comprise an essential component of videotape videocassettes. Videotape tape guides are positioned between a feed reel and a take-up reel of a videotape videocassette, and function to guide the videotape between the two reels.

Existing videotape tape guides are comprised of cylindrical bodies having first ends thereof positioned against a top lid portion of a videotape videocassette, and second ends positioned against the bottom case portion of the videocassette. The tape guides are fixed in position to prevent rotation thereof.

In some instances, the tape guides are fixed in position by shafts extending downwardly from the top lid portion, and upwardly from the bottom case portion of the videocassette. Additionally, each shaft may further contain a longitudinally extending rib formed on the surface of the shaft and top and bottom and notches may be formed in the respective end portions of the cylindrical bodies of the tape guides. The ribs interfit the notched portions serve to thereby limit rotation of the tape guides.

However, the interfitting of the ribs and the notches unsatisfactorily prevents rotation of the tape guides. Oftentimes the videotape tape guides are loose, and are free to rotate, causing the resultant assembled product to be of poor stability. Further, because the surface of the videotape tape guides contacts with the videotape and because the frictional engagement therebetween must be minimized, a grinding of the tape guide surfaces has been required in order to obtain a smooth surface of uniform circumference. Finally, because the videotape tape guides must be comprised of a nonmagnetic material, the tape guides account for a disproportionate amount of the cost of the videocassette.

It is therefore an object of the present invention to provide an improved videotape tape guide for a videocassette.

It is a further object of the present invention to provide an improved videotape tape guide for a videocassette of a decreased expense.

SUMMARY OF THE INVENTION

In accordance with the present invention, a videotape tape guide for guiding videotape of a videocassette wherein the videocassette is formed of a bottom case portion and a top lid portion is disclosed. The videotape tape guide is comprised of an elongated cylinder having a first open end and a second open end wherein the first open end is positioned in an abutting relationship with the bottom case portion of the videocassette and wherein the second end is positioned in an abutting relationship with the top lid portion of the videocassette, and wherein the elongated cylinder contains means forming a groove extending longitudinally from the first open end of the elongated cylinder to the second open end of the elongated cylinder such groove defining spaced-apart surfaces extending longitudinally along the length of the elongated cylinder.

In the preferred embodiment of the present invention, an upwardly extending shaft is formed on the surface of the bottom case portion of the videocassette, and extends into the first open end of the elongated cylinder. A downwardly extending shaft is formed on the top lid portion of the videocassette, and extends into the second open end of the elongated cylinder. A longitudinally extending rib is formed on both the upwardly extending shaft and the downwardly extending shaft wherein each rib is of dimensions suitable to extend into the groove extending longitudinally through the elongated cylinder. Preferably, the ribs are of widths to substantially span the gap separating the spaced-apart surfaces of the groove to prevent rotation of the elongated cylinder thereby.

The videotape tape guide constructed according to the teachings of the present invention allows firms seating of the tape guide to the videocassette body, thereby precluding rotation thereof. Further, because the videotape tape guide of the present invention contains a groove extending longitudinally along the entire length of the tape guide, the cost of the videotape tape guide of the present invention is reduced.

BRIEF DESCRIPTION OF THE DRAWINGS

The present invention will be better understood when read in light of the accompanying drawings in which.

DESCRIPTION OF THE PREFERRED EMBODIMENTS

Figure 1:
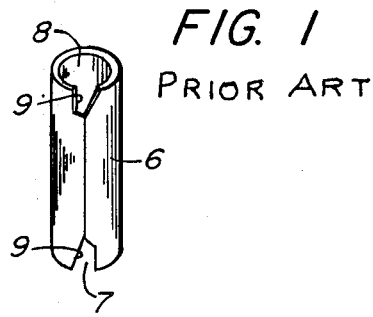
FIG. 1 is a perspective illustration of a conventional, prior art tape guide.

Referring first now to the perspective illustration of FIG. 1, there is illustrated a videotape tape guide of the prior art. The prior art tape guide is comprised of a cylindrical body 6 having an open bottom end 7 and open top end 8. Notched portions 9 extend into the cylindrical body 6 from the opposing open ends. As described hereinabove, notched portions 9 engage with the videocassette in an interfitting relationship to prevent rotation of the tape guide. However, as also mentioned previously, the interfitting between the notched portions 9 of the prior art tape guide are frequently unsatisfactory to prevent rotation of the tape guide.

Figure 2:
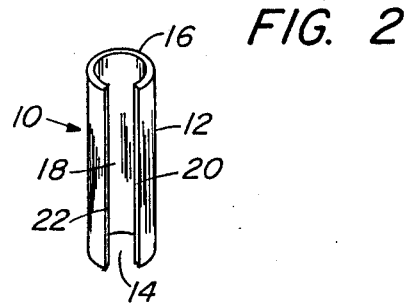
FIG. 2 is a perspective illustration of the videotape tape guide of the present invention.

Turning now to the perspective illustration of FIG. 2, there is shown the videotape tape guide, referred to generally by reference numeral 10, of the present invention. Tape guide 10 is comprised of an elongated cylindrical body 12 having bottom open end 14 and top open end 16. A longitudinally extending groove 18 extends along the entire length of the elongated cylindrical body 12 from bottom open end 14 to top open end 16. Groove 18 defines spaced apart surfaces 20 and 22 which extend along the entire length of the elongated cylinder 12.

Figure 3:
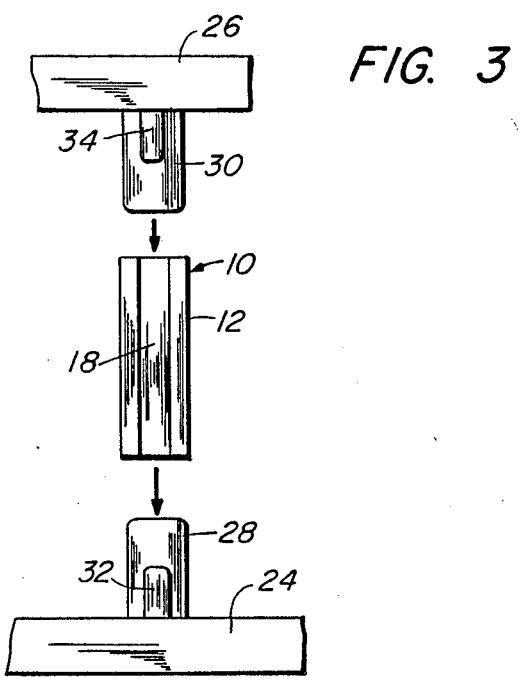
FIG. 3 is an exploded, side, in elevation, view of the videotape tape guide of the present invention further illustrating the connection of the tape guide to a videocassette.

Referring now to the exploded view, in elevation, of FIG. 3, there is shown the videotape tape guide 10 of the present invention and the connection thereof to a videocassette, a portion of which is illustrated in the Figure. The videocassette includes bottom case portion 24 and top lid portion 26, only portions of which are illustrated in the FIG. Formed on bottom case portion 24 is upwardly extending shaft 28. Similarly, formed on upper lid portion 26 is downwardly extending shaft 30. Shafts 28 and 30 are aligned with one another to allow positioning of the tape guide 10 in order to contact with both shafts 28 and 30. Formed on the surface of shaft 28 is a longitudinally extending rib 32, and formed on the surface of downwardly extending shaft 30 is rib 34. Ribs 32 and 34 are of widths substantially corresponding to the width of groove 18. Connection of the videotape tape guide 10 to the videocassette is completed by sliding the bottom open end 14 of the tape guide 10 onto upwardly extending shaft 28 such that shaft 28 extends into the elongated cylinder 12. Rib 32 extends into groove 18 and substantially spans the gap separating surfaces 20 and 22. Similarly, top lid portion 26 of the videocassette is connected to the videotape tape guide 10 by sliding downwardly extending shaft 30 through top open end 16 of the elongated cylinder 12 and into the cylinder 12. Longitudinally extending rib 34 extends into groove 18 and substantially spans the gap separating surfaces 20 and 22. In this manner, tape guide 10 is affixed to the videocassette, and rotation of the tape guide is prevented.

Tape guide 10 of the present invention is also of advantage as the cost of material required to produce the tape guide is less than that of prior art tape guides. Because longitudinally extending groove 18 extends along the entire length of the elongated cylinder 12, the amount of nonmagnetic material required to form each tape guide 10 is reduced, thereby lowering the cost of each tape guide. Finally, the tape guide 10 constructed according to the teachings of the present invention obviates the need for grinding of the tape guide.

Figure 4:
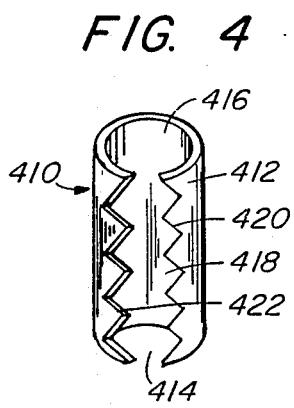
FIG. 4 is a perspective illustration of an alternative embodiment of the present invention.
Figure 5:
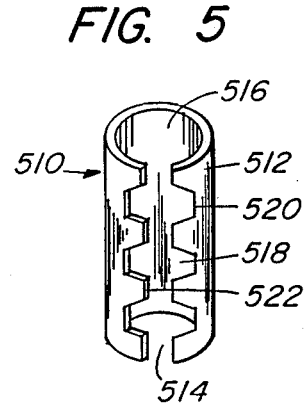
FIG. 5 is a perspective illustration of another embodiment of the present invention.

Referring now to the perspective illustrations of FIGS. 4 and 5, there are shown alternate embodiments of the tape guide 10 of the present invention. Videotape tape guide 410 of FIG. 4, similar to the embodiment of FIG. 2, is comprised of an elongated cylindrical body 412 having bottom open end 414 and top open end 416. In this embodiment, however, longitudinally extending groove 418 defines multi-ridged opposing surfaces 420 and 422. Videotape tape guide 510 is comprised of elongated cylinder 512 having bottom open end 514 and top open end 516. In this embodiment, groove 518 again defines multi-ridged opposing surfaces 520 and 522. The embodiments of FIGS. 4 and 5 allow the amount of material required for each tape guide to be still further reduced. Connection of tape guides 410 and 510 to a videocassette is similar to that of the described connection of tape guide 10 of FIG. 2 to a videocassette.

While the present invention has been described in accordance with the preferred embodiments of the various figures, it is to be understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

What is claimed is:

1. A videotape guide for guiding a videotape in a videocassette, said videocassette formed of a bottom case portion and a top lid portion, said videotape guide comprised of:

an elongated cylinder having a first open end and a second open end, wherein said first open end is positioned in an abutting relationship with the bottom case portion of the videocassette, and wherein said second open end is positioned in an abutting relationship with the top lid portion of the videocassette, means forming a groove extending longitudinally from said first open end of the elongated cylinder to said second open end of the elongated cylinder, said groove defining spaced-apart surfaces extending longitudinally along the length of the elongated cylinder, said spaced-apart surfaces being formed with a series of spaced recesses.

2. A videotape guide according to claim 1, wherein said recesses of said surface are symmetrically arranged and take the form of a series of teeth.

3. A videotape guide according to claim 1, wherein said recesses of said surfaces also are symmetrically arranged and take the form of a series of generally rectangular shaped openings.

* * * * *